United States Patent
Nobukiyo

(10) Patent No.: US 9,094,982 B2
(45) Date of Patent: Jul. 28, 2015

(54) SETTING APPARATUS, COMMUNICATION SYSTEM, BASE STATION, AND PROGRAM

(75) Inventor: Takahiro Nobukiyo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 358 days.

(21) Appl. No.: 13/634,765

(22) PCT Filed: Apr. 1, 2011

(86) PCT No.: PCT/JP2011/058403
§ 371 (c)(1),
(2), (4) Date: Sep. 13, 2012

(87) PCT Pub. No.: WO2011/125929
PCT Pub. Date: Oct. 13, 2011

(65) Prior Publication Data
US 2013/0005380 A1    Jan. 3, 2013

(30) Foreign Application Priority Data

Apr. 2, 2010 (JP) ................................ 2010-086222

(51) Int. Cl.
*H04B 7/00* (2006.01)
*H04W 72/06* (2009.01)
*H04W 72/08* (2009.01)

(52) U.S. Cl.
CPC ............ *H04W 72/06* (2013.01); *H04W 72/082* (2013.01)

(58) Field of Classification Search
USPC .................. 455/450–455, 67.11, 67.13, 63.1; 370/310, 315–320
See application file for complete search history.

(56) References Cited

U.S. PATENT DOCUMENTS

| | | | |
|---|---|---|---|
| 2009/0124261 A1* | 5/2009 | Shimomura | 455/436 |
| 2010/0061298 A1 | 3/2010 | Kato et al. | |
| 2010/0067471 A1* | 3/2010 | Matsuzawa | 370/329 |
| 2010/0203882 A1* | 8/2010 | Frenger et al. | 455/423 |
| 2010/0254344 A1* | 10/2010 | Wei et al. | 370/330 |
| 2011/0149879 A1* | 6/2011 | Noriega et al. | 370/329 |

FOREIGN PATENT DOCUMENTS

| | | |
|---|---|---|
| WO | 2008/007437 A1 | 1/2008 |
| WO | 2008/053653 A1 | 5/2008 |
| WO | 2008/111224 A1 | 9/2008 |

OTHER PUBLICATIONS

3GPP TS 36.300 V8.9.0 (Jun. 2009); 3GPP TSG RAN E-UTRA and E-UTRAN Overall description, p. 86.

(Continued)

*Primary Examiner* — Fayyaz Alam
(74) *Attorney, Agent, or Firm* — Sughrue Mion, PLLC

(57) ABSTRACT

This invention is directed to provision of a technique for dynamically performing a priority band establishment that can achieve the suppression of interference between adjacent cells. This invention is characterized in that: a base-point resource block, which serves as a base point in establishing a priority resource block to be used, on a priority basis, by a terminal for which the quality of a communication path does not meet a predetermined quality, is so decided as to be different from the base-point resource block of an adjacent communication area; and the priority resource block is established, based on a communication load, in a predetermined order with the decided base-point resource block used as the base point.

10 Claims, 17 Drawing Sheets

(56) References Cited

OTHER PUBLICATIONS

3GPP TSG RAN R1-061928, Performance evaluation of uplink interference avoidance techniques, Free scale Semiconductor Jun. 2006, Cannes, France.

3GPP TS 36.423 V8.6.0 (Jun. 2009), 3GPP TSG RAN EUTRAN X2AP, pp. 27, 48-49.

International Search Report of PCT/JP2011/058403 dated Jul. 5, 2011.

* cited by examiner

SETTING APPARATUS, COMMUNICATION SYSTEM, BASE STATION, AND PROGRAM

CROSS REFERENCE TO RELATED APPLICATIONS

This application is a National Stage of International Application No. PCT/JP2011/058403 filed Apr. 1, 2011, claiming priority based on Japanese Patent Application No. 2010-086222 filed Apr. 2, 2010, the contents of all of which are incorporated herein by reference in their entirety.

TECHNICAL FIELD

The present invention relates to setting apparatus, communications system, base station, and program.

BACKGROUND ART

In cellular environments, such as LTE (Long Term Evolution) standardized in the 3GPP (3rd Generation Partnership Project), it is assumed that a plurality of base stations are disposed, where each base station communicates with terminals within its communication area. The communication area is generally referred to as a cell, which may be divided into a plurality of sub-regions by imparting directivity to an antenna of the base station. The sub-region will be referred to as a sector cell herein. In the following description, the term cell refers to a sector cell.

Generally, in LTE, the same wireless bandwidth is used among cells. Therefore, when performing transmission using the same wireless resource as that for an adjacent cell, a cell will experience strong interference from the adjacent cell (which will be referred to as inter-cell interference hereinbelow) regardless of whether the link is an uplink or downlink.

For example, in an uplink, a terminal located in the proximity of the base station having even a modest transmission power still has communication path quality that is not degraded much because of a large difference between a desired signal received by the base station and a level of interference by the adjacent cell. On the other hand, a terminal located in the proximity of the border of a cell poses a problem that it has significantly degraded communication path quality especially when a terminal in an adjacent cell located in the proximity of the border of the cell performs transmission using the same wireless resource at the same time, because of a smaller difference between a desired signal and a level of interference by the adjacent cell.

The same applies to a downlink, wherein when the transmission power is constant among cells, for example, a terminal located in the proximity of the border of a cell similarly poses a problem that communication path quality is significantly degraded because of a smaller difference between a desired signal to be received by the terminal and a level of interference by the adjacent cell.

Thus, the inter-cell interference issue is experienced regardless of whether the link is an uplink or a downlink. Moreover, since wireless communications also encounter shadowing, which is a variation of the intensity of radio waves, by blocking or reflection of radio waves by buildings, etc., cells that do not geographically lie next to a current cell may become an "adjacent" cell in terms of inter-cell interference.

FIG. 1 is an exemplary overview of a wireless communications system. A base station BS1 manages three cells C11, C12, C13, and base stations BS2-BS4 each likewise manage a plurality of cells. Communication is established between terminals located in the cells. In the illustrated example, a terminal UE1 is contained in a cell C11, and a terminal UE2 is contained in a cell C32. FIG. 2 shows the cell C11 in FIG. 1 and the actual shape of its adjacent cells C12, C13, C23, C32, C33, C42, taking account of the directivity of an antenna. Ovals indicate coverage of radio waves according to the directivity of antennas C12_1, C13_1, C23_1, C32_1, C33_1, C42_1. An overlapping area of ovals contains a cell border, and hatched hexagons represent actual cells.

A promising technique for solving the inter-cell interference issue is application of ICIC (Inter-cell Interference Coordination) in LTE (see NPL 1, for example). NPL 1 provides a statement that an object of ICIC is to control interference between adjacent cells, and information, such as resource usage or traffic load, from other cells should be taken into account.

Moreover, one method for implementing ICIC is an FFR (Frequency Fractional Reuse) technique (see NPL 2, for example). A fundamental operation of FFR will now be described.

First, a priority bandwidth is set in each cell so that it is different from those of adjacent cells. Next, a terminal reports its communication path quality information to a base station. The base station uses the communication path quality information to determine whether the terminal is less affected by inter-cell interference (which will be referred to as a center terminal) or more affected by inter-cell interference (which will be referred to as an edge terminal). In a case that the terminal is determined as an edge terminal, the base station limits an available bandwidth that can be allocated to the terminal to the priority bandwidth of the own cell. A bandwidth available to a center terminal is not limited. A scheduler allocates a wireless resource depending upon communication path quality from the bandwidth available to each terminal.

FIG. 18 shows an exemplary available bandwidth within each cell when such an FFR technique is applied to a case shown in FIG. 2. It is assumed that the bandwidth is managed by a PRB (Physical Resource Block) number, and a priority bandwidth for each cell is statically set beforehand. The available bandwidth is divided into three sub-groups, PRB1-3, PRB4-6, and PRB7-9, and in an area A0 for a center terminal, all bandwidths PRB1-9 are available. In other areas for edge terminals, any one of the three PRB sub-groups is set as the priority bandwidth.

For example, in an area A11 for an edge terminal in the cell C11 in FIG. 2, PRB1-3 are used as the priority bandwidth. By setting the priority bandwidth so as not to overlap between adjacent cells as in FIG. 18, interference between adjacent cells can be suppressed. Since communication path quality for an edge terminal using a priority bandwidth is improved, improvement of throughput for the edge terminal can be expected.

On the other hand, it is possible to dynamically set the priority bandwidth. In this case, it is necessary to notify the priority bandwidth among base stations. As a method of notifying the priority bandwidth among base stations, LOAD INFORMATION is specified (see NPL 3, for example). The uplink can be notified through HII (High Interference Indication) and the downlink can be notified through RNTP (Relative Narrowband Tx Power). The information notified through HII or RNTP can be created for each PRB number, the PRB being a smallest bandwidth unit for allocation to a user channel. For example, HII of a PRB to be defined as the priority bandwidth is set to one. NPL 3 provides a statement that "'one' indicates high interference sensitivity," so that a PRB number for a terminal susceptible to inter-cell interference is thus notified. Likewise, RNTP of a PRB to be defined as the priority bandwidth is set to one. NPL 3 provides a statement that "'one' indicates no promise on the Tx power is given," so that a PRB number is thus notified without a promise to allow for interference to an adjacent cell.

CITATION LIST

Non Patent Literature

NPL 1: 3GPP TS 36.300 V8.9.0 (2009-06), 3GPP TSG RAN E-UTRA and E-UTRAN Overall description, p. 86.

NPL 2: 3GPP TSG RAN R1-061928, Performance evaluation of uplink interference avoidance techniques, Free scale Semiconductor.

NPL 3: 3GPP TS 36.423 V8.6.0 (2009-06), 3GPP TSG RAN EUTRAN X2AP, pp. 27, 48-49.

SUMMARY OF INVENTION

Technical Problem

Since NPL 2 listed above statically sets the priority bandwidth, inflexibility results. On the other hand, when LOAD INFORMATION is used to appropriately make notification as in NPL 3, there arises a problem that an overlap of the priority bandwidths may occur between adjacent cells with a high probability.

The reason thereof is that the priority bandwidth is arbitrarily set by each cell. HII or RNTP is a message for notifying the priority bandwidth, and it cannot direct an adjacent cell to set a certain priority bandwidth of the adjacent cell. Therefore, an overlap of the priority bandwidth occurs between adjacent cells as shown in FIG. 19, and interference suppression cannot be achieved between adjacent cells for the overlapping PRB.

Therefore, an object to be attained by the present invention is to solve the aforementioned problem, that is, to provide a technique that dynamically performs setting of the priority bandwidth to achieve interference suppression between adjacent cells.

Solution to Problem

To solve the aforementioned problem, the present invention provides a setting apparatus characterized in comprising: determining section for determining a base-point resource block serving as a base point in setting a priority resource block to be preferentially used by a terminal whose communication path quality does not satisfy a predetermined quality, said base-point resource block being determined differently from that for an adjacent communication area; and setting section for setting a priority resource block in a predetermined sequence from said determined base-point resource block serving as a base point based on a communication load.

To solve the aforementioned problem, the present invention provides a communications system characterized in comprising: determining section for determining a base-point resource block serving as a base point in setting a priority resource block to be preferentially used by a terminal whose communication path quality does not satisfy a predetermined quality, said base-point resource block being determined differently from that for an adjacent communication area; and setting section for setting a priority resource block in a predetermined sequence from said determined base-point resource block serving as a base point based on a communication load.

To solve the aforementioned problem, the present invention provides a base station characterized in comprising: determining section for determining a base-point resource block serving as a base point in setting a priority resource block to be preferentially used by a terminal whose communication path quality does not satisfy a predetermined quality, said base-point resource block being determined differently from that for an adjacent communication area; and setting section for setting a priority resource block in a predetermined sequence from said determined base-point resource block serving as a base point based on a communication load.

To solve the aforementioned problem, the present invention provides a setting method characterized in comprising: a determining step of determining a base-point resource block serving as a base point in setting a priority resource block to be preferentially used by a terminal whose communication path quality does not satisfy a predetermined quality, said base-point resource block being determined differently from that for an adjacent communication area; and a setting step of setting a priority resource block in a predetermined sequence from said determined base-point resource block serving as a base point based on a communication load.

To solve the aforementioned problem, the present invention provides a program for a setting apparatus, said program being characterized in causing said setting apparatus to execute: determining processing of determining a base-point resource block serving as a base point in setting a priority resource block to be preferentially used by a terminal whose communication path quality does not satisfy a predetermined quality, said base-point resource block being determined differently from that for an adjacent communication area; and setting processing of setting a priority resource block in a predetermined sequence from said determined base-point resource block serving as a base point based on a communication load.

Advantageous Effects of Invention

An advantageous effect of the present invention is that inter-cell interference suppression is achieved and a throughput property in edge terminals is improved.

DESCRIPTION OF EMBODIMENTS

An overview of the present invention will now be described. It should be noted that a term cell as used hereinbelow refers to a sector cell.

In the present invention, a base-point resource block serving as a base point in setting a priority resource block to be preferentially used by a terminal is determined beforehand differently from an adjacent cell.

Then, when allocating a resource block to the terminal, a decision is made as to whether the communication path quality satisfies a predetermined quality or not. An object thereof is to determine whether the priority resource block should be set for the terminal.

A communication load on the base station is measured, and based on a result of the measurement, a priority resource block is set for the terminal in a predetermined sequence starting from the determined base-point resource block serving as a base point.

Now the present invention will be described in detail hereinbelow.

<First Embodiment>

Embodiments of the present invention will be described in detail with reference to the accompanying drawings.

Figure 3:
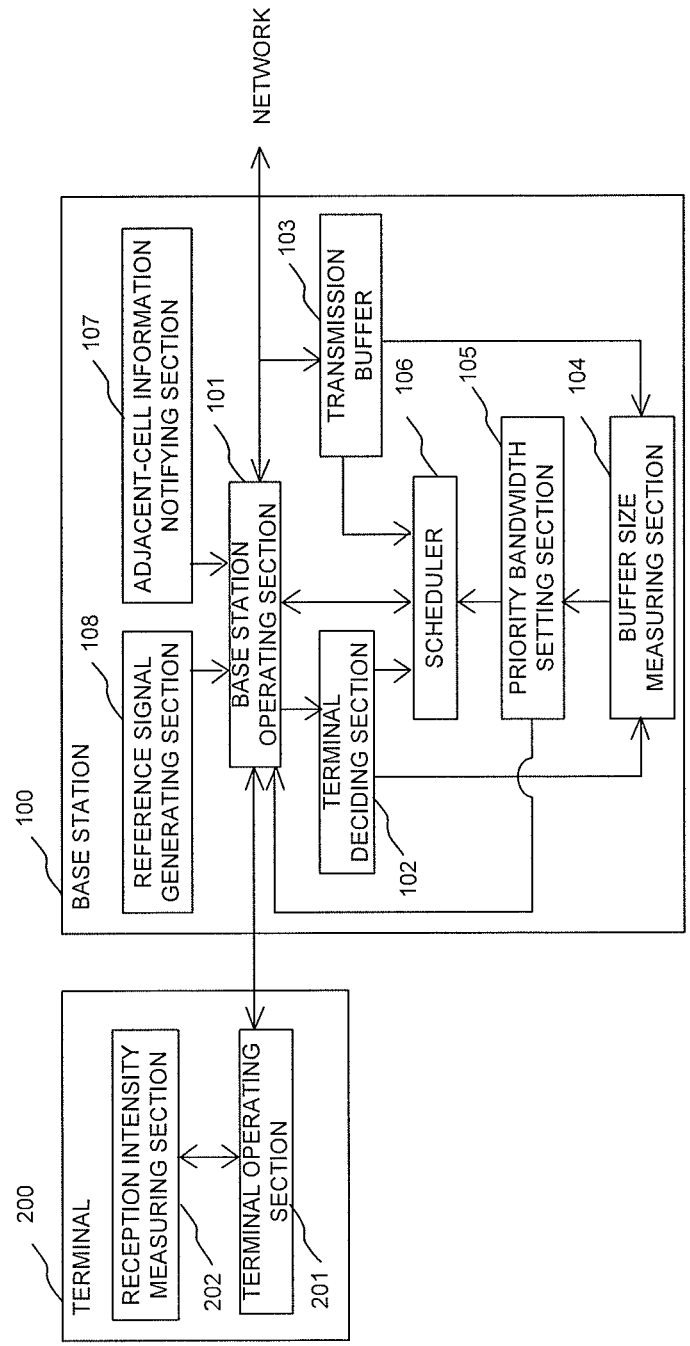
[FIG. 3] A block diagram showing a configuration of a wireless communications system in a first embodiment of the present invention.

FIG. 3 is a block diagram showing an exemplary configuration of a wireless communications system in a first embodiment of the present invention.

As shown in FIG. 3, the wireless communications system of the present invention comprises a base station 100 and a terminal 200. The base station 100 is connected to a network, which is not shown. Although not shown, a plurality of terminals are present, and the base station 100 can be connected with the plurality of terminals. Moreover, a plurality of base stations are present, and the base stations can make communications with one another via the network. In describing this embodiment, an LTE downlink is taken as an example. Moreover, wireless resources will be exemplified by the frequency bandwidth, which is assumed to be divided into RBs (Resource Blocks), the RB being a unit of allocation. Since the LTE downlink multiplexes users according to an OFDMA (Orthogonal Frequency Division Multiple Access) scheme, a scheduler may allocate non-consecutive RBs to a terminal.

As shown in FIG. 3, the base station 100 is comprised of a base station operating section 101, a terminal deciding section 102, a transmission buffer 103, a buffer size measuring section 104, a priority bandwidth setting section 105, a scheduler 106, an adjacent-cell information notifying section 107, and a reference signal generating section 108.

The base station operating section 101 has a function equivalent to those commonly used in wireless communications systems, and since its configuration and operation is widely known, explanation thereof will be omitted herein.

The terminal deciding section 102 has a function of detecting a terminal for which the priority bandwidth should be used. For example, it has a function of deciding whether a terminal to which a resource is to be allocated is one less affected by inter-cell interference (which will be referred to as a center terminal) or one more affected by inter-cell interference (which will be referred to as an edge terminal) based on communication path quality information reported by the terminal 200. A result of the decision is notified to the buffer size measuring section 104 and scheduler 106.

The transmission buffer 103 has a function of storing data that has arrived from the network and is to be transmitted to the terminal 200, along with management information including the arrival time and the number of the destination terminal for transmission.

The buffer size measuring section 104 has a function of measuring the size of data stored in the transmission buffer 103 as load information for the own cell taking account of whether the terminal is a center terminal or an edge terminal. The load information is notified to the priority bandwidth setting section 105.

The priority bandwidth setting section 105 has a function of creating a list of numbers of RBs that can be set as the priority bandwidth, a function of selecting from the list an RB to be set as the priority bandwidth for the own cell using the load information, and a function of notifying the priority bandwidth to adjacent base stations.

The scheduler 106 has a function of determining a wireless resource to be allocated to the terminal using the information on the priority bandwidth set in the priority bandwidth setting section 105 and the information on the decision as to a center terminal or an edge terminal decided in the terminal deciding section 102, and transmitting data in the transmission buffer 103 to the present terminal based on a result of the allocation. For the edge terminal, the priority bandwidth is preferentially allocated. For the center terminal, the whole bandwidth is allocatable. It should be noted that in a case that no priority bandwidth is set, the whole bandwidth is also allocatable for the edge terminal.

Figure 1:
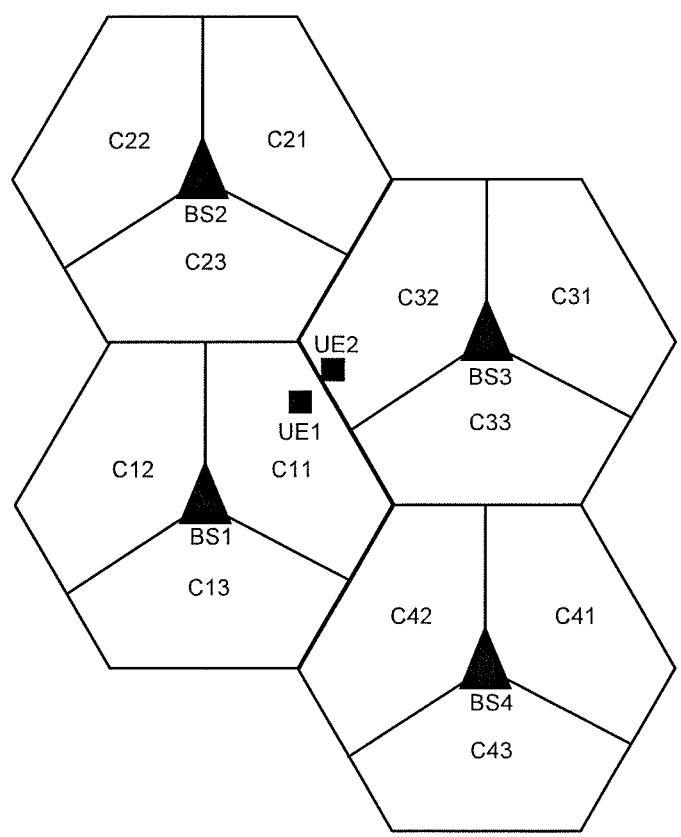
[FIG. 1] A diagram showing an exemplary arrangement of base stations and terminals in a wireless communications system of the present invention.
Figure 2:
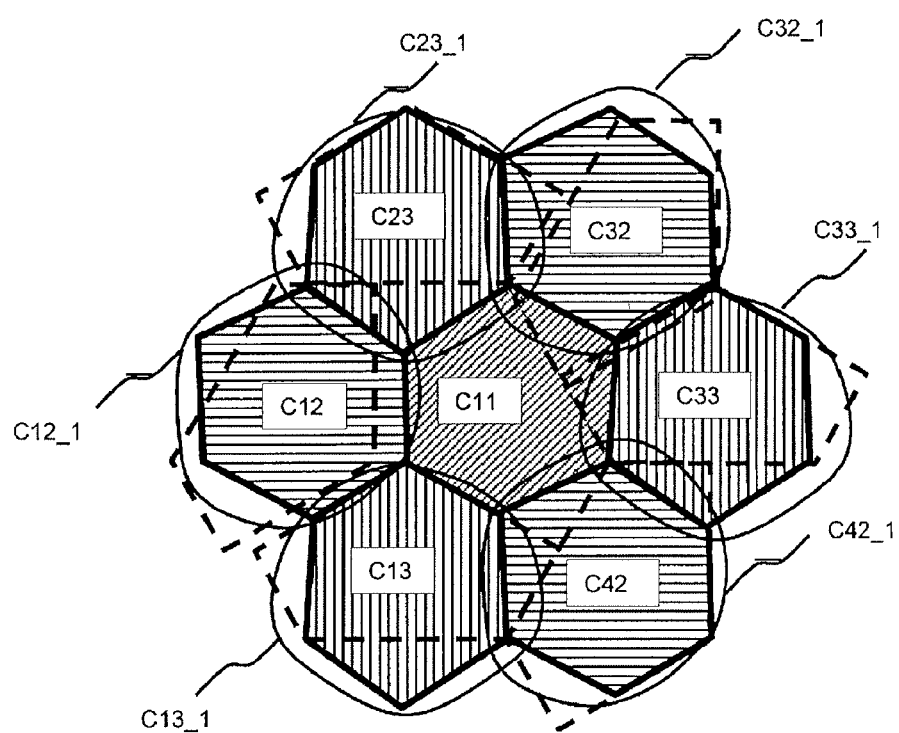
[FIG. 2] A diagram showing an exemplary geometry of cells in the present invention.

The adjacent-cell information notifying section 107 has a function of notifying the adjacent-cell information, such as the adjacent cell numbers, to the base station operating section 101. When cell C11 in FIG. 2 is the own cell, the adjacent-cell information notifying section 106 notifies the cell numbers C12, C13, C23, C32, C33, C42 to the terminal in the own cell as the adjacent-cell information.

The reference signal generating section 108 has a function of transmitting a reference signal serving as a reference of the communication path quality to the base station operating section 101 at a predetermined time. The adjacent-cell information and reference signal are transmitted from the base station operating section 101 to the terminal.

The terminal 200 is comprised of a terminal operating section 201 and a reception intensity measuring section 202.

The terminal operating section 201 has a function equivalent to those commonly used in wireless communications systems, and since its configuration and operation is widely known, an explanation thereof will be omitted herein.

The reception intensity measuring section 202 has a function of measuring the communication path quality from a reference signal received from the base station 100, and reporting a result to the terminal operating section 201. In this embodiment, the reception intensity measuring section 202 measures as the communication path quality the received power of reference signals (RSRP: Reference Signal Received Power) in the own cell and in the adjacent cells based on the notification from the adjacent-cell information notifying section 107. The communication path quality measured by the reception intensity measuring section 202 is transmitted to the base station via the terminal operating section 201.

Next, an operation of the present embodiment will be described with reference to the drawings. The following description will be sequentially made of an operating procedure by the priority bandwidth setting section 105 for creating a list of numbers of RBs that can be set as the priority bandwidth, an operating procedure by the terminal deciding section 102 for deciding whether the terminal is a center terminal or an edge terminal, an operating procedure by the buffer size measuring section 104 for measuring the size of data stored in the transmission buffer 103 as load information, and an operating procedure by the priority bandwidth setting section 105 for selecting an RB to be set as the priority bandwidth for the own cell from the list using the load information.

Figure 4:
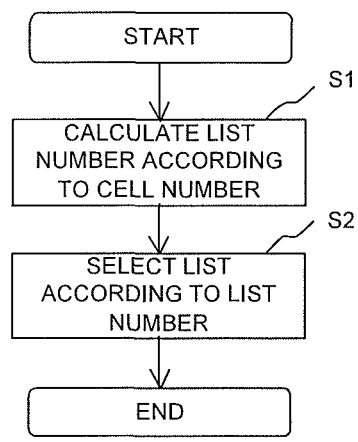
[FIG. 4] A flow chart showing an operating procedure for creating a list of numbers of RBs that can be set as the priority bandwidth in the first embodiment of the present invention.

FIG. 4 shows the operating procedure by the priority bandwidth setting section 105 for creating a list of numbers of RBs that can be set as the priority bandwidth.

The priority bandwidth setting section 105 calculates a list number according to a cell number for the number of an RB that can be set as the priority bandwidth (S1) using EQ. 1:

$$\text{List\_number} = 1 + \text{MOD}(C_n, \text{NumList}), \quad (\text{EQ. 1})$$

where $C_n$ denotes a cell number, and NumList denotes a number of lists that can be selected. MOD(a, b) represents a remainder after dividing a by b.

Figure 5:
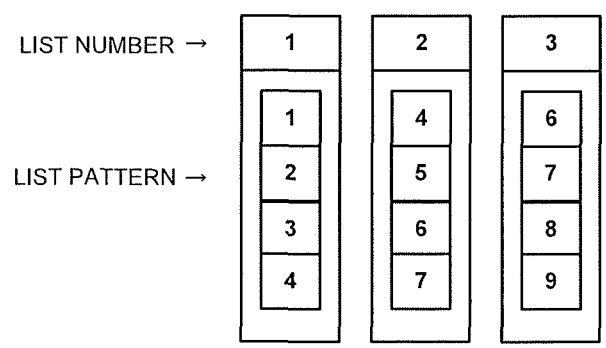
[FIG. 5] An example of lists in the first embodiment of the present invention.
Figure 6:
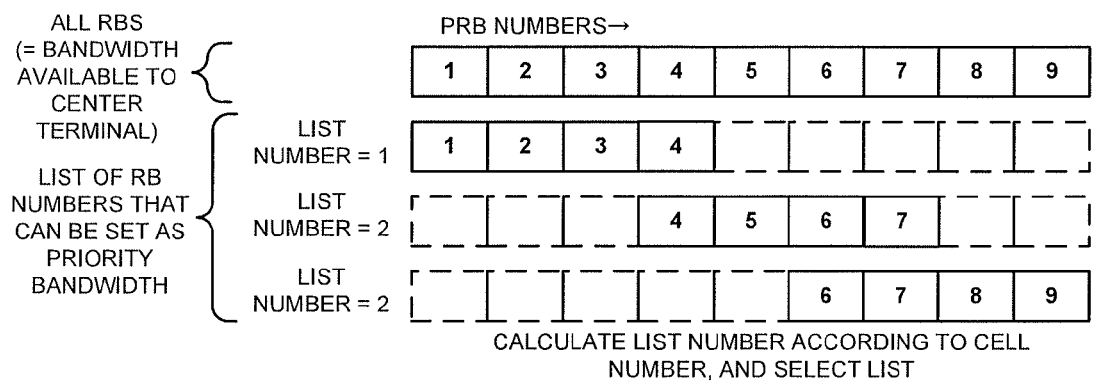
[FIG. 6] An example of all RBs and lists according to respective list numbers in the first embodiment of the present invention.

Next, a list is selected from among list patterns according to the list number (S2). FIG. 5 shows an example of list patterns that are created beforehand. In a list pattern, the identification numbers of allocatable RBs are provided. Although it is preferable to exclude any overlap of RBs between list patterns, each list pattern may at least have a different RB serving as a base point in setting the priority bandwidth. For example, in the example in FIG. 5, a list pattern numbered as list number "1" has a base point RB of "1", a list pattern numbered as list number "2" has a base point RB of "4", a list pattern numbered as list number "3" has a base point RB of "6". NumList is three here. For example, for cell C11 in FIG. 2, the list number is MOD(11, 3)=2, and the RB numbers contained in the list are 4, 5, 6, 7. FIG. 6 shows all RBs and lists according to respective list numbers together. For the cell arrangement as in FIG. 2, it is possible to create lists different among adjacent cells by selecting a list from list patterns according to the list number as given by EQ. 1. It is basically enough to execute the present operation once, such as at the startup of the base station.

Figure 7:
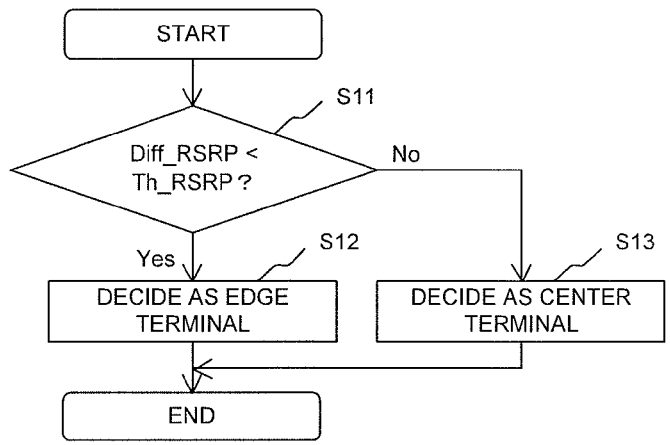
[FIG. 7] A flow chart showing an operating procedure for deciding whether a terminal is a center terminal or an edge terminal in the first embodiment of the present invention.

FIG. 7 shows the operating procedure by the terminal deciding section 102 for deciding the terminal is a center terminal or an edge terminal based on communication path quality information reported from the terminal 200.

The terminal deciding section 102 calculates a communication path quality difference Diff_RSRP [dB] between the own cell and adjacent cell using EQ. 2, and compares the difference with threshold Th_RSRP [dB] (S11).

$$\text{Diff\_RSRP} = \text{RSRP\_Serv} - \text{Max}\{\text{RSRP\_Neig}(j)\}, \quad (\text{EQ. 2})$$

where RSRP_Serv [dB] denotes RSRP of the own cell. RSRP_Neig(j) [dB] denotes RSRP of each adjacent cell j, and Max {RSRP_Neig(j)} represents calculation of a highest value of RSRP among the adjacent cells.

In a case that Diff_RSRP is smaller than Th_RSRP (S11, Yes), the terminal is decided to be an edge terminal, which is more affected by inter-cell interference (S12). Similarly, in a case that Diff_RSRP is equal to or greater than Th_RSRP (S11, No), the terminal is decided to be a center terminal, which is less affected by inter-cell interference (S13). A result of the present operating procedure is used by the buffer size measuring section 104 and scheduler 106.

Figure 8:
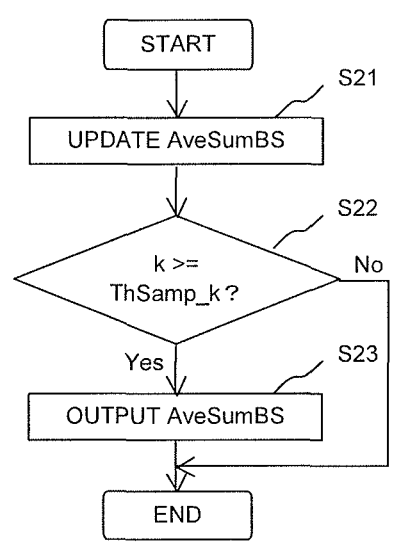
[FIG. 8] A flow chart showing an operating procedure for measuring the size of data stored as load information in the first embodiment of the present invention.

FIG. 8 shows the operating procedure by the buffer size measuring section 104 for measuring the size of data stored in the transmission buffer 103 as load information taking account of whether the terminal is a center terminal or an edge terminal.

The buffer size measuring section 104 updates an average value AveSumBS of the total buffer size for all edge terminals subsidiary to the base station using EQ. 3 (S21):

$$\text{AveSumBS} = \{\text{AveSumBS}*(k-1) + \text{InstSumBS}\}/k, \quad (\text{EQ. 3})$$

where k denotes the number of update operations, and InstSumBS denotes the total value of the current buffer size of all edge terminals in the own cell. The initial values for AveSumBS and k are zero.

Next, a decision is made as to whether the number of update operations k reaches a required number of averaging operations ThSamp_k (S22). In a case that the value is reached (S22, Yes), AveSumBS is notified to the priority bandwidth setting section 105, and AveSumBS and k are reset to zero (S23). The operating procedure in FIG. 8 is periodically executed in a predetermined cycle.

Figure 9:
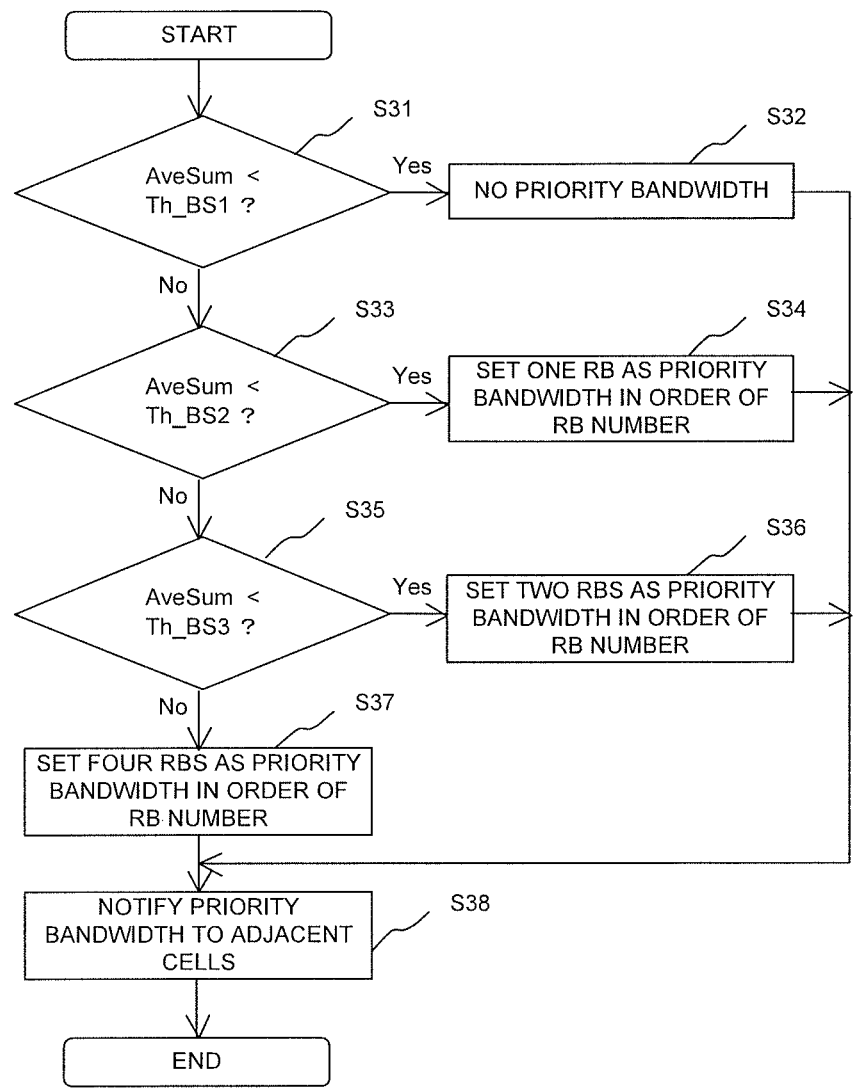
[FIG. 9] A flow chart showing an operating procedure for selecting an RB to be set as the priority bandwidth from the list in first embodiment of the present invention.

FIG. 9 shows the operating procedure by the priority bandwidth setting section 105 for selecting an RB to be set as the priority bandwidth for the own cell from the list using the load information measured in the buffer size measuring section 104.

In a case that AveSumBS is smaller than threshold Th_BS1 (S31, Yes), the priority bandwidth setting section 105 sets no priority bandwidth (S32). In a case that it is equal to or greater than Th_BS1 (S31, No), and is smaller than threshold Th_BS2 (S33, Yes), the section 105 sets one RB from the list in order of RB number as the priority bandwidth (S34).

In a case that AveSumBS is equal to or greater than Th_BS2 (S33, No), and is smaller than threshold Th_BS3 (S35, Yes), the section 105 sets two RBs from the list in a predetermined sequence as the priority bandwidth (S36). The predetermined sequence is an order of the identification numbers of the RB.

In a case that AveSumBS is equal to or greater than Th_BS3 (S35, No), all RBs in the list are set as the priority bandwidth (S37). It should be noted that the relationship of the magnitude of the thresholds is: Th_BS1≤Th_BS2≤Th_BS3.

A result of the setting is notified to adjacent base stations (S38).

Figure 10:
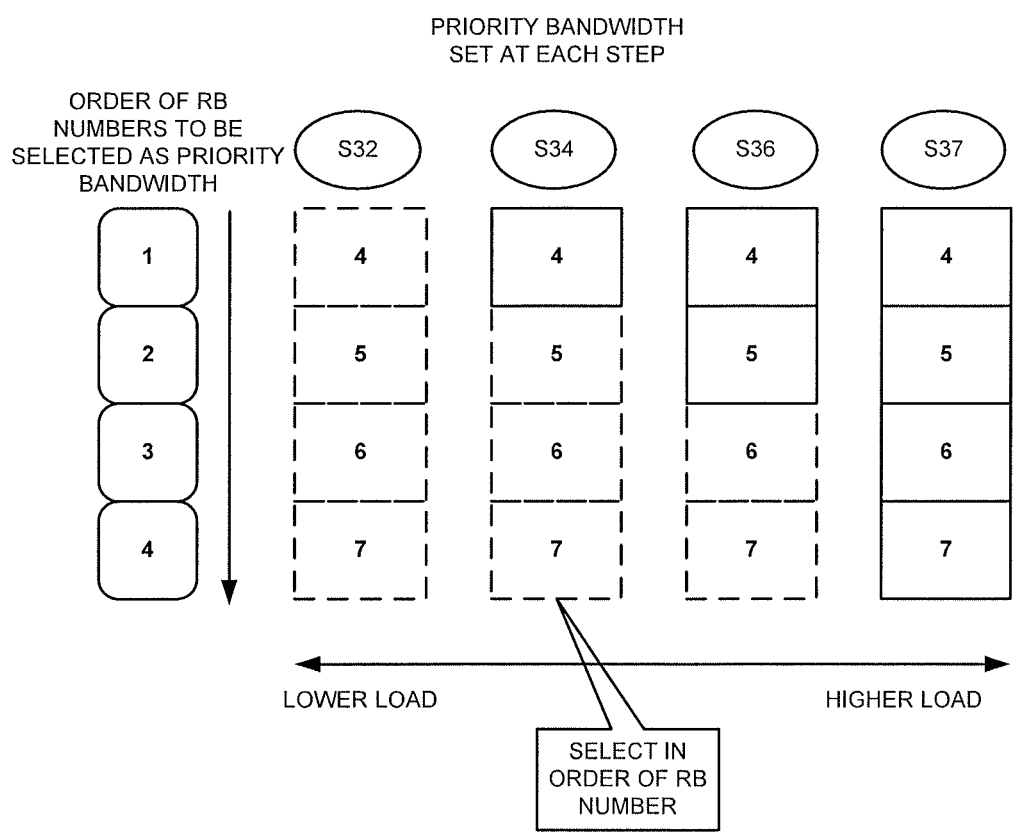
[FIG. 10] An example of RBs set as the priority bandwidth from the list according to the load in the first embodiment of the present invention.

FIG. 10 shows a condition in which the priority bandwidth setting section 105 is setting RBs serving as the priority bandwidth from the base point RB in order of the identification number according to the operating procedure of FIG. 9. The hatched RB numbers represent that they are set as the priority bandwidth. The symbols Sxx (xx=32, 34, 36, 37) in the drawing represent the Step number in FIG. 9. For example, at S36, RB numbers 4, 5 are set as the priority bandwidth. In this embodiment, it is decided that edge users are experiencing a higher load for larger AveSumBS, and a larger priority bandwidth is set. Alternatively, for a lower load, no priority bandwidth is set and accordingly no FFR is executed. A cell notified of the priority bandwidth may also sets the priority bandwidth taking account of the priority bandwidth for adjacent cells.

As described above, the present embodiment sets the priority bandwidth in order of RB number in the list according to the load on the own cell.

While in this embodiment, RSRP is measured as a difference in communication path quality between the own cell and adjacent cell, the present invention is not limited thereto, and, for example, a ratio of the received power for a reference signal to the total received power (RSRQ: Reference Signal Received Quality) may be measured. Moreover, a ratio of the received power for a reference signal to the interference power and noise power (SINR: Signal to Interference plus Noise Ratio) may be measured. Further, a pass loss calculated from the difference between the received power for a reference signal and transmission power may be measured. The signal to be measured is not limited to the reference signal, and may be a pilot signal, broadcast signal or the like.

Moreover, while in this embodiment, the load is measured by the buffer size that is the load on the own cell, the present invention is not limited thereto, and the load on the own cell may be measured by the average rate, for example. For a higher load, the average rate is lowered. Furthermore, the wireless resource usage rate, such as RB usage rate, may be measured. The RB usage rate increases for a higher load. Further, the number of edge users having data to be transmitted may be measured. The number of users is increased for a higher load.

In addition, while in this embodiment, the list to be used is determined according to the formula as given by EQ. 1, the present invention is not limited thereto, and any other formula may be employed insofar as the list is differentiated among adjacent cells.

<Second Embodiment>

Next, a second embodiment of the present invention will be described in detail with reference to the drawings. The description of the embodiment above has addressed the configuration in which the priority bandwidth is set according to the load on the own cell. The description of the present embodiment will address a configuration in which the priority bandwidth is set according to the load on other cells.

Figure 11:
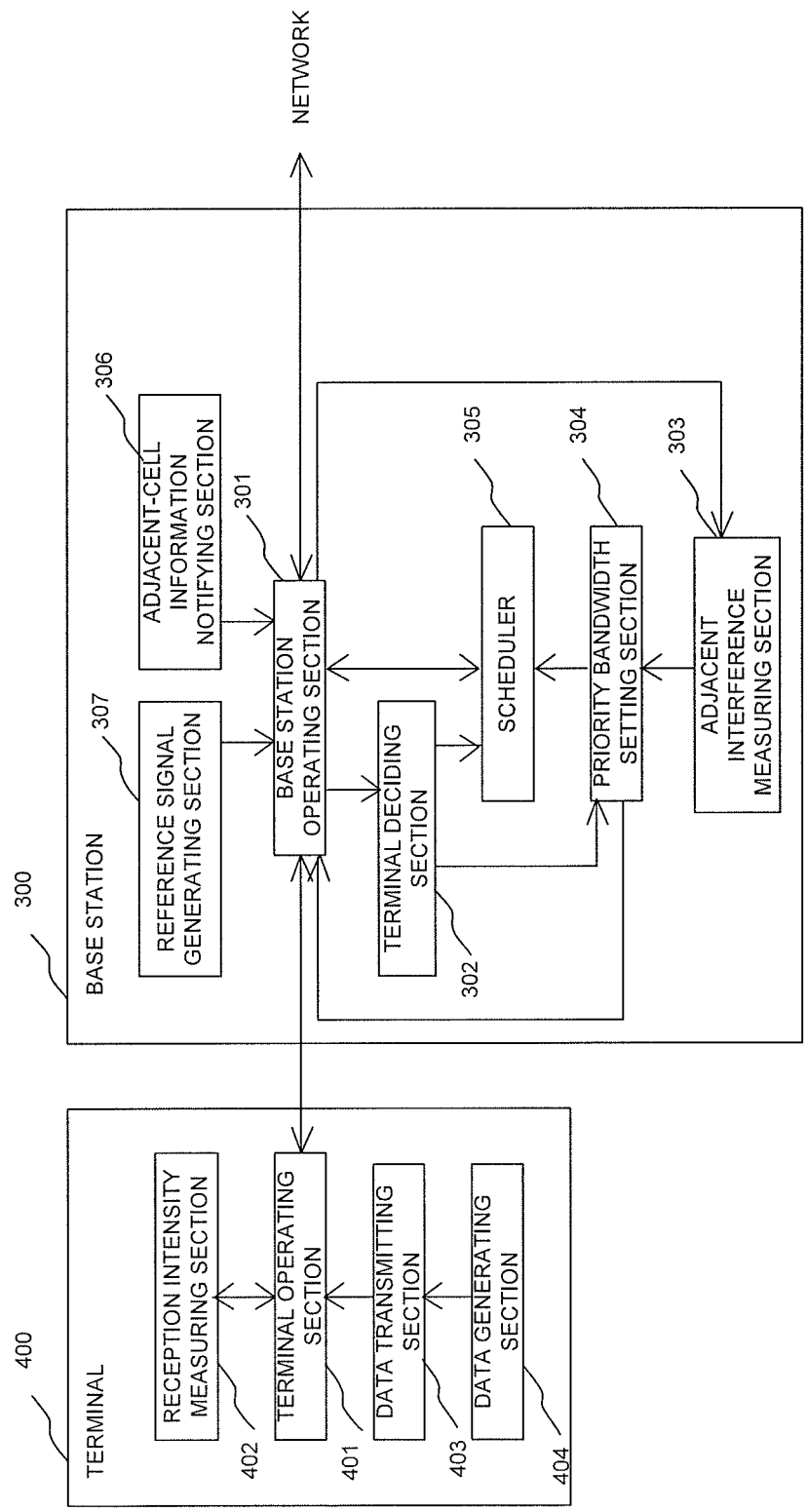
[FIG. 11] A block diagram showing a configuration of a wireless communications system in a second embodiment of the present invention.

FIG. 11 is a block diagram showing an exemplary configuration of a wireless communications system in the present embodiment.

Connections between a base station 300, a terminal 400, and a network are similar to those in the first embodiment. In this embodiment, the description will be made taking an LTE uplink as an example. Again, wireless resources will be exemplified by the frequency bandwidth, which is assumed to be divided into RBs, the RB serving as a unit of allocation, as in the first embodiment. Since the LTE uplink multiplexes users according to an SC-FDMA (Single Carrier Frequency Division Multiple Access) scheme, the scheduler must allocate consecutive RBs to a terminal.

With regard to the configurations of the base station 300 and terminal 400, in a case that they have the same functions as those in the first embodiment in FIG. 3, the same denotation will be employed and their description will be omitted.

The base station 300 is comprised of a base station operating section 301, a terminal deciding section 302, an adjacent interference measuring section 303, a priority bandwidth setting section 304, a scheduler 305, an adjacent-cell information notifying section 306, and a reference signal generating section 307.

The base station operating section 301 has a similar function to that of the base station operating section 101 in the first embodiment.

The terminal deciding section 302 has a similar function to that of the terminal deciding section 102 in the first embodiment, and additionally has a function of measuring the number of edge terminals. In this embodiment, a result of the decision is notified to the priority bandwidth setting section 304 and scheduler 305.

The adjacent interference measuring section 303 has a function of measuring the noise-to-interference power IoT (Interference over Thermal) in receiving data transmitted by the terminal 200 as load information for other cells. The load information is notified to the priority bandwidth setting section 304.

The priority bandwidth setting section 304 has a similar function to that of the priority bandwidth setting section 105 in the first embodiment.

The scheduler 305 has a function of determining a wireless resource to be allocated to the terminal using the information on the priority bandwidth set in the priority bandwidth setting section 304 and the information on the decision as to a center terminal or an edge terminal decided in the terminal deciding section 302, and transmitting scheduling information to the terminal based on a result of the allocation.

The adjacent-cell information notifying section 306 has a similar function to that of the adjacent-cell information notifying section 107 in the first embodiment.

The reference signal generating section 307 has a similar function to that of the reference signal generating section 108 in the first embodiment.

The terminal 400 is comprised of a terminal operating section 401, a reception intensity measuring section 402, a data transmitting section 403, and a data generating section 404.

The terminal operating section 401 has a similar function to that of the terminal operating section 201 in the first embodiment.

The reception intensity measuring section 402 has a similar function to that of the reception intensity measuring section 202 in the first embodiment.

The data transmitting section 403 has a function of transmitting data from the data generating section 404 based on the scheduling information received from the base station 300.

The data generating section 404 has a function of generating data to be transmitted by the terminal 200, and storing the data along with management information such as the generation time.

Next, an operation of the present embodiment will be described with reference to the drawings. The following description will be sequentially made of an operating procedure by the priority bandwidth setting section 304 for creating a list of numbers of RBs that can be set as the priority bandwidth, an operating procedure by the terminal deciding section 302 for deciding whether the terminal is a center terminal or an edge terminal, an operating procedure by the adjacent interference measuring section 303 for measuring IoT as the load information, and an operating procedure by the priority bandwidth setting section 304 for selecting an RB to be set as the priority bandwidth for the own cell from the list using the load information.

Figure 12:
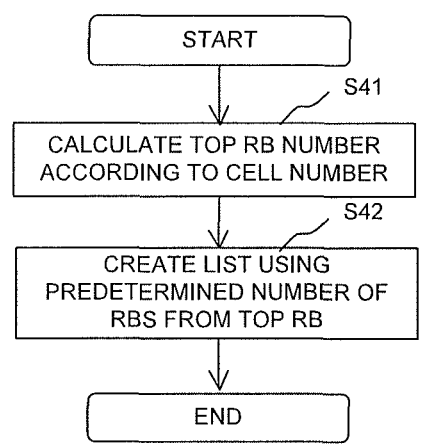
[FIG. 12] A flow chart showing an operating procedure for creating a list of numbers of RBs that can be set as the priority bandwidth in the second embodiment of the present invention.

FIG. 12 shows the operating procedure by the priority bandwidth setting section 304 for creating a list of numbers of RBs that can be set as the priority bandwidth.

The priority bandwidth setting section 304 calculates a top RB number to be set in the list (S41) using EQ. 4:

$$\text{Top\_RB\_number} = 1 + \text{MOD}(a*C_n*C_n + b*C_n + c, \text{NumRb}) \quad \text{(EQ. 4)}$$

where a, b, c are parameters common to base stations, and NumRB denotes the total number of RBs. The RB number is defined to start from one. $C_n$ denotes the cell number as in the first embodiment.

Next, starting from the calculated top RB number, a predetermined consecutive number NumRb_Pri of RBs are selected to create a list (S42). For example, assuming that a=4, b=0, c=5, NumRb=9, and NumRb_Pri=4, then, Top_RB_number=1+MOD(4*11*11+0*11+5, 9)=4 for cell C11 in FIG. 2, so that the RB numbers contained in the list are the following four RBs: 4, 5, 6, and 7.

The operating procedure by the terminal deciding section 302 for deciding the terminal is a center terminal or an edge terminal is similar to that in the first embodiment in FIG. 7.

Figure 13:
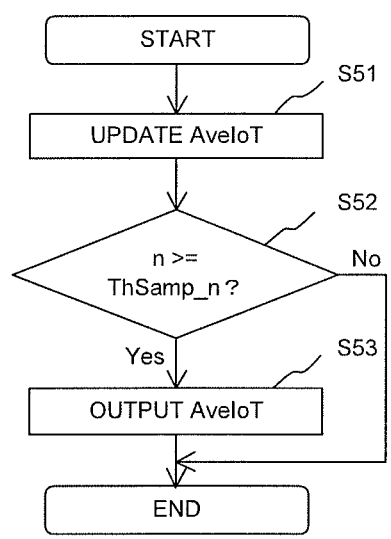
[FIG. 13] A flow chart showing an operating procedure for measuring an IoT as load information in the second embodiment of the present invention.

FIG. 13 shows the operating procedure by the adjacent interference measuring section 303 for measuring IoT as the load information.

The adjacent interference measuring section 303 updates average IoT (AveIoT) (S51) using EQ. 5:

$$\text{AveIoT} = \{\text{AveIoT}*(n-1) + \text{InstAveIoT}\}/n, \quad \text{(EQ. 5)}$$

where n denotes the number of update operations, InstAveIoT denotes a simple average of IoT over RBs. The initial values for AveIoT and n are zero and are updated by a true value.

Next, a decision is made as to whether the number of update operations n reaches a required number of averaging operations ThSamp_n (S22). In a case that the value is reached (S22, Yes), AveIoT is notified to the priority bandwidth setting section 105, and AveIoT and n are reset to zero (S23). The operating procedure in FIG. 13 is periodically executed in a predetermined cycle.

Figure 14:
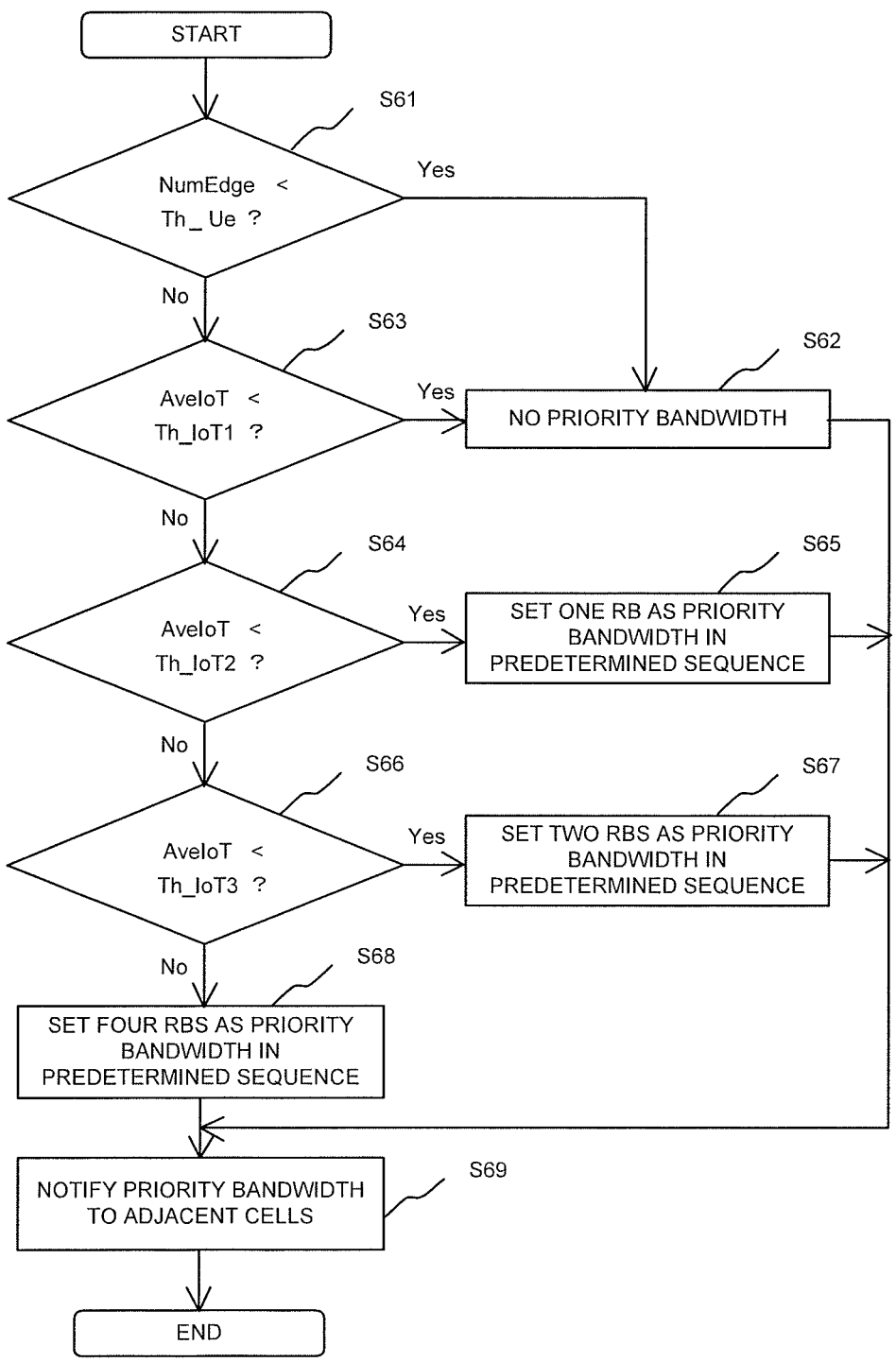
[FIG. 14] A flow chart showing an operating procedure for selecting an RB to be set as the priority bandwidth from the list in the second embodiment of the present invention.

FIG. 14 shows the operating procedure by the priority bandwidth setting section 304 for selecting an RB to be set as the priority bandwidth for the own cell from the list using the load information measured in the adjacent interference measuring section 303 and the number of edge terminals NumEdge measured in the terminal deciding section 302.

In a case that NumEdge is smaller than a threshold for the number of terminals Th_Ue (S61, Yes), the priority bandwidth setting section 304 sets no priority bandwidth (S62).

In a case that NumEdge is equal to or greater than Th_Ue (S61, No), and AveIoT is smaller than IoT threshold Th_IoT1 (S63, Yes), the section 304 sets no priority bandwidth (S62).

In a case that NumEdge is equal to or greater than Th_IoT1 (S63, No), and is smaller than IoT threshold Th_IoT2 (S64, Yes), the section 304 sets one RB from the list in a predetermined sequence as the priority bandwidth (S65). The predetermined sequence refers to an order obtained by sorting the list by the RB number, defining the centermost RB as the base point, and alternately adding thereto adjacent RBs. In a case that the number of RBs in the list is even, an RB having a smaller number is defined as the base point.

In a case that NumEdge is equal to or greater than Th_IoT2 (S64, No), and is smaller than IoT threshold Th_IoT3 (S66, Yes), the section 304 sets two RBs from the list in the predetermined sequence as the priority bandwidth (S67). In a case that NumEdge is equal to or greater than Th_IoT3, all RBs in the list are set as the priority bandwidth (S68). It should be noted that the relationship of the magnitude of the thresholds is: Th_IoT1≤Th_IoT12≤Th_IoT3.

Next, a result of the setting is notified to adjacent base stations (S69).

Figure 15:
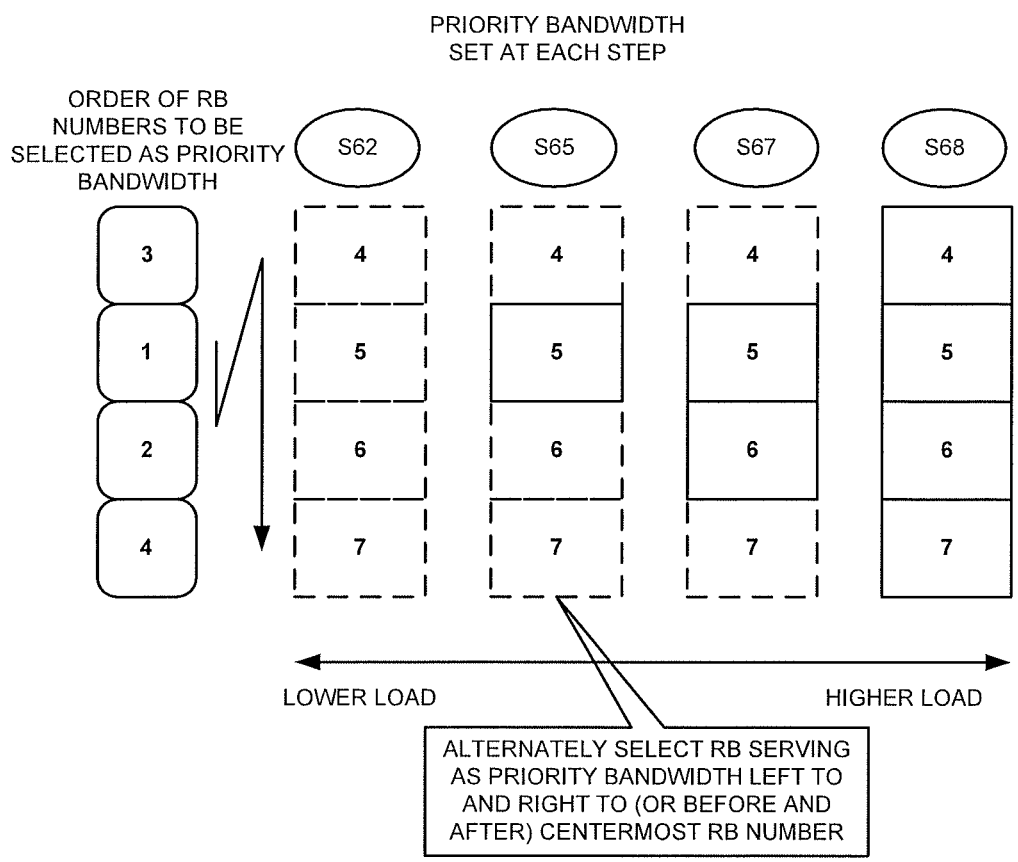
[FIG. 15] An example of RBs set as the priority bandwidth from the list according to the load in the second embodiment of the present invention.

FIG. 15 shows RBs serving as the priority bandwidth set by the operating procedure of FIG. 14. The hatched RB numbers represent that they are set as the priority bandwidth. The symbols Syy (yy=62, 65, 67, 68) in the drawing represent the Step number in FIG. 14. For example, at S67, RB numbers 5, 6 are set as the priority bandwidth. In this embodiment, it is decided that a higher load is experienced for larger AveIoT, and a larger priority bandwidth is set. However, no priority bandwidth is set when the number of edge terminals is low.

Figure 16:
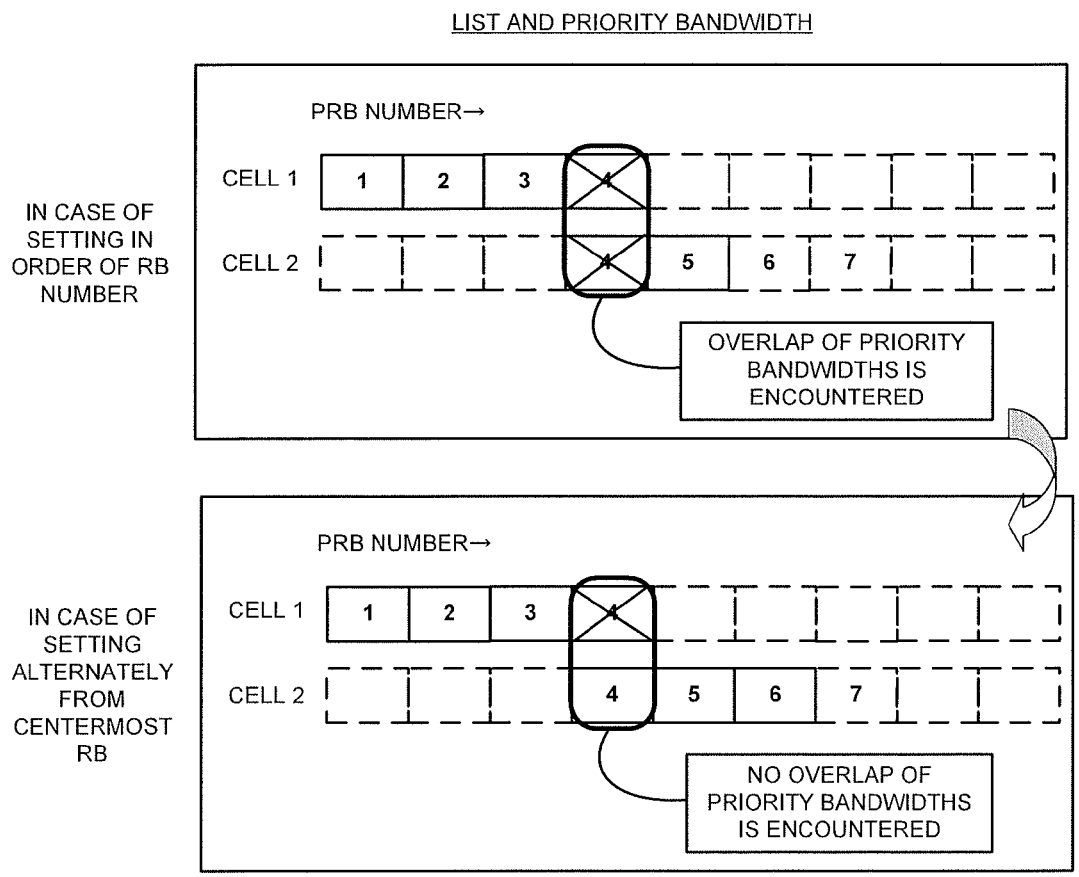
[FIG. 16] An example for explaining that the set priority bandwidth is less likely to experience an overlap between adjacent cells in the second embodiment of the present invention.

As described above, in this embodiment, RBs in the list are sorted by the RB number, the centermost RB is defined as the base point, and adjacent RBs are alternately added. By thus setting the priority bandwidth according to the present method, the priority bandwidth is less likely to experience an overlap with adjacent cells, as shown in FIG. 16. In FIG. 16, cell 1 and cell 2 are adjacent to each other, and the number of RBs for the priority bandwidth is four in cell 1 and is two in cell 2.

Moreover, while in this embodiment, the top RB number in the list is defined by a quadratic function as given by EQ. 4, the present invention is not limited thereto, and any function that depends upon the sector number may be employed.

Furthermore, while in this embodiment, IoT, which is the load on other cells including adjacent cells, is measured as the load, the present invention is not limited thereto, and the load on other cells may be represented using, for example, the communication path quality such as SINR corresponding to a channel for transmitting user data. SINR lowers for a higher load because interference by other cells increases.

While the present invention has been described with reference to several embodiments, the present invention is not limited to these embodiments.

As can be seen from the fact that the first embodiment is described taking a downlink as an example and the second embodiment is described taking an uplink as an example, the present invention is applicable to other systems employing an FDMA (Frequency Division Multiple access) scheme that applies frequency multiplexing regardless of whether the link is an uplink or a downlink.

Moreover, while the load on the own cell is measured in the first embodiment and the load on other cells is measured in the second embodiment, the present invention is not limited thereto, and both the load on the own cell and that on other cells, for example, may be measured for use.

Furthermore, while lists are created employing consecutive RBs in the first and second embodiments, the present invention is not limited thereto, and the lists may be created employing, for example, non-consecutive RBs. However, consecutive RBs must be allocated for a modulation scheme of SC-FDMA, it is desirable to create the lists including some amount of consecutive RBs.

Figure 17:
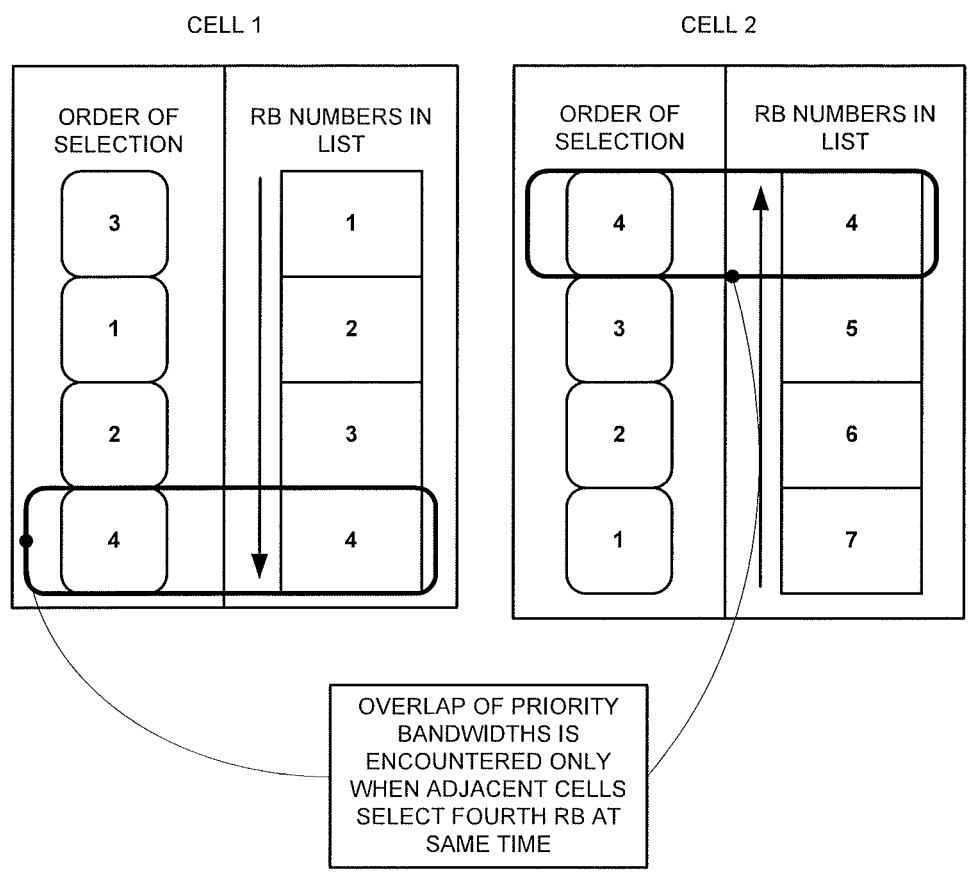
[FIG. 17] An example for explaining that the set priority bandwidth is less likely to experience an overlap between adjacent cells in another embodiment of the present invention.
Figure 18:
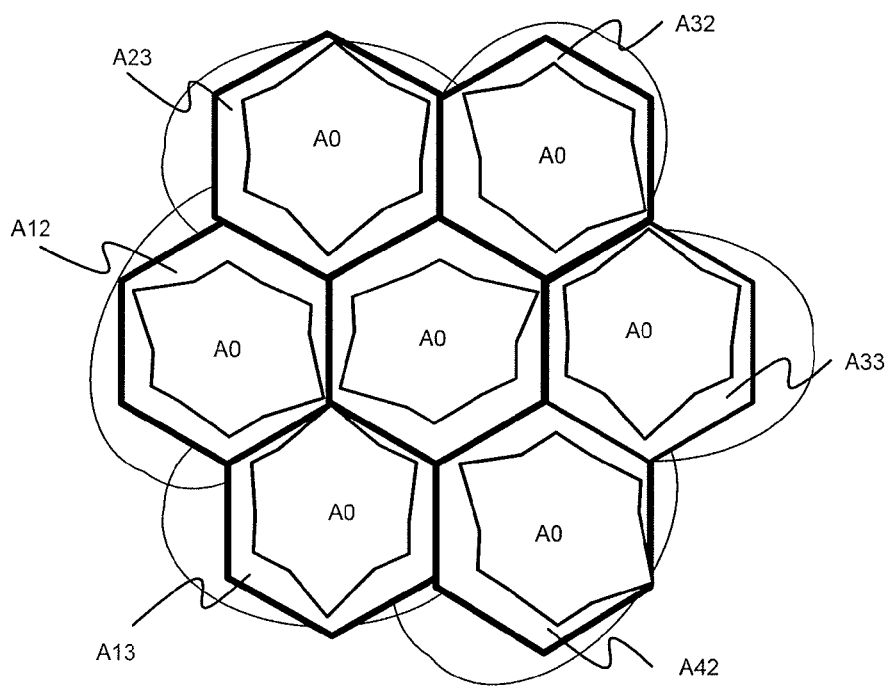
[FIG. 18] An example in which the priority bandwidth is statically set.
Figure 18:
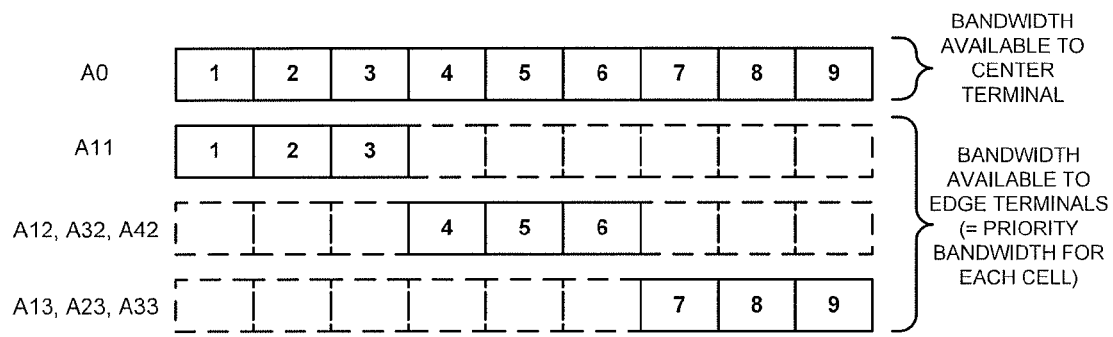
Figure 19:
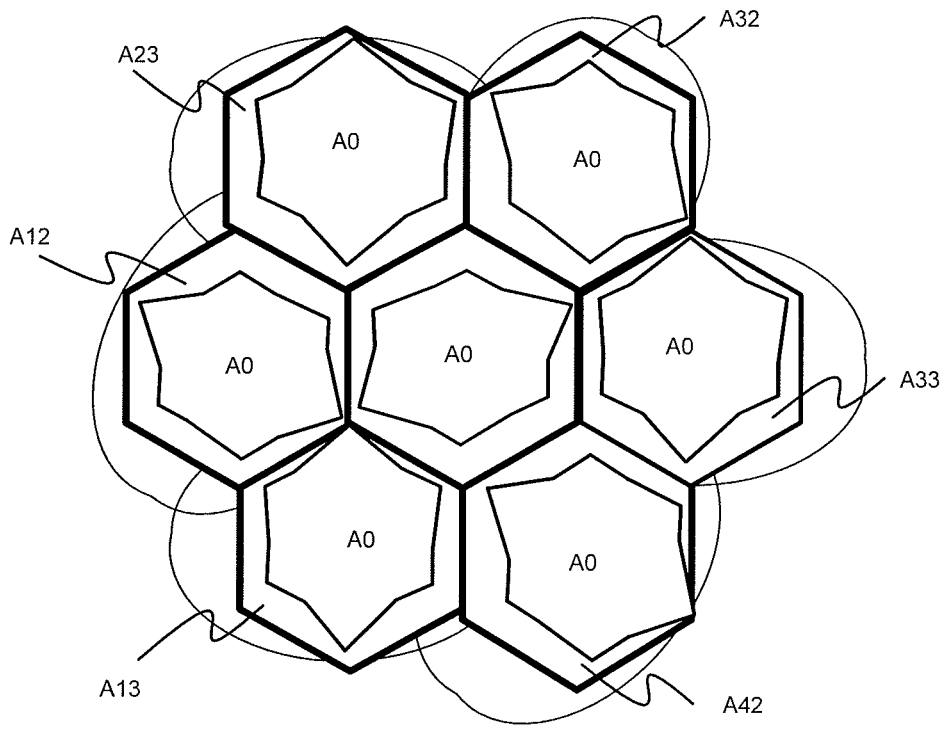
[FIG. 19] An example showing the priority bandwidth for explaining a problem.
Figure 19:
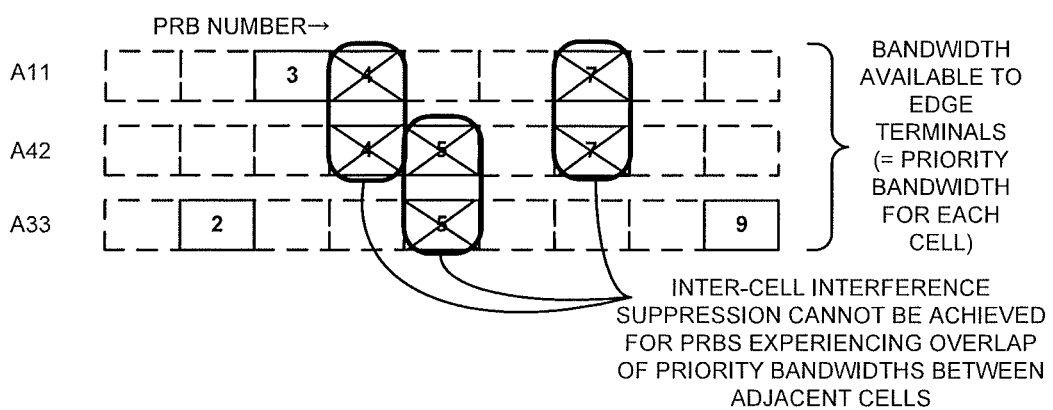

Moreover, while the priority bandwidth is set in the first embodiment by a method of setting RBs from the list in order of RB number, and is set in the second embodiment by a method of sorting RBs in the list by the RB number, defining the centermost RB as the base point, and alternately adding thereto adjacent RBs, the present invention is not limited thereto insofar as a method makes the priority bandwidth less likely to experience an overlap with adjacent cells, and for example, a method of setting the order of RBs to be set as the priority bandwidth so that some cells have an order inverse to the adjacent cell may be contemplated. FIG. 17 shows a particular example. It is assumed that a cell 1 and a cell 2 are adjacent to each other. RBs in the list are sorted by the RB number, an RB to be defined as the priority bandwidth is selected in an ascending order for the cell 1, and an RB is selected in an inverse order, or in a descending order, in the adjacent cell. Thus, similarly to the second embodiment, the priority bandwidth may be made less likely to experience an overlap with adjacent cells.

Furthermore, while the present invention has been described in the embodiments above using a configuration in which the priority bandwidth is set in the base station, a configuration may be contemplated in which a setting apparatus connected with base stations via a network is disposed in the communications system, and the setting apparatus controls setting of the priority bandwidth for the base stations.

In addition, it is obvious that the operations of the embodiments explained using the flow charts and the like may be configured by storing their operating procedures as a program in a recording medium to be loaded on a computer for execution. Moreover, the operations may be configured by storing some operating procedures as a program in a recording medium to be loaded on a computer for execution.

According to the present invention described above, a list of bandwidth numbers that can be set as the priority bandwidth to be allocated to a terminal more affected by inter-cell interference is set as differently between adjacent cells as possible, and the priority bandwidth is set according to a load from the list in a predetermined sequence. Thus, since avoidance of an overlap of the priority bandwidths between adjacent cells can be achieved while securing the priority bandwidth according to the load, interference between adjacent cells can be suppressed. As a result, channel quality of a terminal more affected by inter-cell interference is improved in the priority bandwidth, so that a throughput property of that terminal is improved. Moreover, since wireless resource usage efficiency of the terminal is improved, the overall throughput property of the whole system is also improved.

While the present invention has been described with reference to embodiments, the present invention is not limited thereto, and several modifications may be made within the scope of technical ideas.

The present application claims priority based on Japanese Patent Application No. 2010-086222 filed on Apr. 2, 2010, the disclosure of which is incorporated herein in its entirety.

(Appendix 1)

A setting apparatus characterized in comprising:

determining section for determining a base-point resource block serving as a base point in setting a priority resource block to be preferentially used by a terminal whose communication path quality does not satisfy a predetermined quality, said base-point resource block being determined differently from that for an adjacent communication area; and setting section for setting a priority resource block in a predetermined sequence from said determined base-point resource block serving as a base point based on a communication load.

(Appendix 2)

The setting apparatus as recited in appendix 1, characterized in that said predetermined sequence is an order of an identification number for uniquely identifying a resource block.

(Appendix 3)

The setting apparatus as recited in appendix 1, characterized in that said predetermined sequence is an order of an identification number for uniquely identifying a resource block, wherein the order is arranged alternately and adjacently before and after said base-point resource block.

(Appendix 4)

The setting apparatus as recited in appendix 1, characterized in that said predetermined sequence is an order of an identification number for uniquely identifying a resource block, wherein the descending order and ascending order are different between said adjacent communication area and an own communication area.

(Appendix 5)

The setting apparatus as recited in any one of appendices 1-4, characterized in that said communication load is a communication load on an own communication area.

(Appendix 6)

The setting apparatus as recited in any one of appendices 1-4, characterized in that said communication load is a communication load on communication areas other than an own communication area.

(Appendix 7)

The setting apparatus as recited in any one of appendices 1-5, characterized in that said communication load is a size of data queuing for transmission.

(Appendix 8)

The setting apparatus as recited in any one of appendices 1-5, characterized in that said communication load is an average rate.

(Appendix 9)

The setting apparatus as recited in any one of appendices 1-5, characterized in that said communication load is a wireless resource usage rate.

(Appendix 10)

The setting apparatus as recited in any one of appendices 1-5, characterized in that said communication load is the number of terminals.

(Appendix 11)

The setting apparatus as recited in any one of appendices 1-4 and 6, characterized in that said communication load is a noise-to-interference power ratio.

(Appendix 12)

The setting apparatus as recited in any one of appendices 1-4 and 6, characterized in that said communication load is communication path quality.

(Appendix 13)

A communications system characterized in comprising:

determining section for determining a base-point resource block serving as a base point in setting a priority resource block to be preferentially used by a terminal whose communication path quality does not satisfy a predetermined quality, said base-point resource block being determined differently from that for an adjacent communication area; and setting section for setting a priority resource block in a predetermined sequence from said determined base-point resource block serving as a base point based on a communication load.

(Appendix 14)

The communications system as recited in appendix 13, characterized in that said predetermined sequence is an order of an identification number for uniquely identifying a resource block.

(Appendix 15)

The communications system as recited in appendix 13, characterized in that said predetermined sequence is an order of an identification number for uniquely identifying a resource block, wherein the order is arranged alternately and adjacently before and after said base-point resource block.

(Appendix 16)

The communications system as recited in appendix 13, characterized in that said predetermined sequence is an order of an identification number for uniquely identifying a resource block, wherein a descending order and an ascending order are different between said adjacent communication area and an own communication area.

(Appendix 17)

The communications system as recited in any one of appendices 13-16, characterized in that said communication load is a communication load on an own communication area.

(Appendix 18)

The communications system as recited in any one of appendices 13-16, characterized in that said communication load is a communication load on communication areas other than an own communication area.

(Appendix 19)

The communications system as recited in any one of appendices 13-17, characterized in that said communication load is a size of data queuing for transmission.

(Appendix 20)

The communications system as recited in any one of appendices 13-17, characterized in that said communication load is an average rate.

(Appendix 21)

The communications system as recited in any one of appendices 13-17, characterized in that said communication load is a wireless resource usage rate.

(Appendix 22)

The communications system as recited in any one of appendices 13-17, characterized in that said communication load is the number of terminals.

(Appendix 23)

The communications system as recited in any one of appendices 12-16 and 18, characterized in that said communication load is a noise-to-interference power ratio.

(Appendix 24)

The communications system as recited in any one of appendices 13-16 and 18, characterized in that said communication load is communication path quality.

(Appendix 25)

A base station characterized in comprising:

determining section for determining a base-point resource block serving as a base point in setting a priority resource block to be preferentially used by a terminal whose communication path quality does not satisfy a predetermined quality, said base-point resource block being determined differently from that for an adjacent communication area; and setting section for setting a priority resource block in a predetermined sequence from said determined base-point resource block serving as a base point based on a communication load.

(Appendix 26)

The base station as recited in appendix 25, characterized in that said predetermined sequence is an order of an identification number for uniquely identifying a resource block.

(Appendix 27)

The base station as recited in appendix 25, characterized in that said predetermined sequence is an order of an identification number for uniquely identifying a resource block, wherein the order is arranged alternately and adjacently before and after said base-point resource block.

(Appendix 28)

The base station as recited in appendix 25, characterized in that said predetermined sequence is an order of an identification number for uniquely identifying a resource block, wherein a descending order and an ascending order are different between said adjacent communication area and an own communication area.

(Appendix 29)

The base station as recited in any one of appendices 25-28, characterized in that said communication load is a communication load on an own communication area.

(Appendix 30)

The base station as recited in any one of appendices 25-28, characterized in that said communication load is a communication load on communication areas other than an own communication area.

(Appendix 31)

The base station as recited in any one of appendices 25-29, characterized in that said communication load is a size of data queuing for transmission.

(Appendix 32)

The base station as recited in any one of appendices 25-29, characterized in that said communication load is an average rate.

(Appendix 33)

The base station as recited in any one of appendices 25-29, characterized in that said communication load is a wireless resource usage rate.

(Appendix 34)

The base station as recited in any one of appendices 25-29, characterized in that said communication load is the number of terminals.

(Appendix 35)

The base station as recited in any one of appendices 25-28 and 30, characterized in that said communication load is a noise-to-interference power ratio.

(Appendix 36)

The base station as recited in any one of appendices 25-28 and 30, characterized in that said communication load is communication path quality.

(Appendix 37)

A setting method characterized in comprising:

a determining step of determining a base-point resource block serving as a base point in setting a priority resource block to be preferentially used by a terminal whose communication path quality does not satisfy a predetermined quality, said base-point resource block being determined differently from that for an adjacent communication area; and a setting step of setting a priority resource block in a predetermined sequence from said determined base-point resource block serving as a base point based on a communication load.

(Appendix 38)

The setting method as recited in appendix 37, characterized in that said predetermined sequence is an order of an identification number for uniquely identifying a resource block.

(Appendix 39)

The setting method as recited in appendix 37, characterized in that said predetermined sequence is an order of an identification number for uniquely identifying a resource block, wherein the order is arranged alternately and adjacently before and after said base-point resource block.

(Appendix 40)

The setting method as recited in appendix 37, characterized in that said predetermined sequence is an order of an identification number for uniquely identifying a resource block, wherein a descending order and an ascending order are different between said adjacent communication area and an own communication area.

(Appendix 41)
The setting method as recited in any one of appendices 37-40, characterized in that said communication load is a communication load on an own communication area.

(Appendix 42)
The setting method as recited in any one of appendices 37-40, characterized in that said communication load is a communication load on communication areas other than an own communication area.

(Appendix 43)
The setting method as recited in any one of appendices 37-41, characterized in that said communication load is a size of data queuing for transmission.

(Appendix 44)
The setting method as recited in any one of appendices 37-41, characterized in that said communication load is an average rate.

(Appendix 45)
The setting method as recited in any one of appendices 37-41, characterized in that said communication load is a wireless resource usage rate.

(Appendix 46)
The setting method as recited in any one of appendices 37-41, characterized in that said communication load is the number of terminals.

(Appendix 47)
The setting method as recited in any one of appendices 37-40 and 42, characterized in that said communication load is a noise-to-interference power ratio.

(Appendix 48)
The setting method as recited in any one of appendices 37-40 and 42, characterized in that said communication load is communication path quality.

(Appendix 49)
A program for a setting apparatus, said program being characterized in causing said setting apparatus to execute:
 determining processing of determining a base-point resource block serving as a base point in setting a priority resource block to be preferentially used by a terminal whose communication path quality does not satisfy a predetermined quality, said base-point resource block being determined differently from that for an adjacent communication area; and
 setting processing of setting a priority resource block in a predetermined sequence from said determined base-point resource block serving as a base point based on a communication load.

(Appendix 50)
A program for a base station, said program being characterized in causing said base station to execute:
 determining processing of determining a base-point resource block serving as a base point in setting a priority resource block to be preferentially used by a terminal whose communication path quality does not satisfy a predetermined quality, said base-point resource block being determined differently from that for an adjacent communication area; and
 setting processing of setting a priority resource block in a predetermined sequence from said determined base-point resource block serving as a base point based on a communication load.

REFERENCE SIGNS LIST

100 Base station
101 Base station operating section
102 Terminal deciding section
103 Transmission buffer
104 Buffer size measuring section
105 Priority bandwidth setting section
106 Scheduler
107 Adjacent-cell information notifying section
108 Reference signal generating section
200 Terminal
201 Terminal operating section
202 Reception intensity measuring section
300 Base station
301 Base station operating section
302 Terminal deciding section
303 Adjacent interference measuring section
304 Priority bandwidth setting section
305 Scheduler
306 Adjacent-cell information notifying section
307 Reference signal generating section
400 Terminal
401 Terminal operating section
402 Reception intensity measuring section
403 Data transmitting section
404 Data generating section

The invention claimed is:
1. A setting apparatus comprising:
 a determining section for determining a base-point resource block serving as a base point in setting a priority resource block to be preferentially used by a terminal whose communication path quality does not satisfy a predetermined quality, said base-point resource block being determined differently from that for an adjacent communication area; and
 a setting section for setting said priority resource block in a predetermined sequence from said determined base-point resource block serving as a base point based on a communication load.

2. The setting apparatus according to claim 1, wherein said predetermined sequence is an order of an identification number for uniquely identifying a resource block.

3. The setting apparatus according to claim 1, wherein said predetermined sequence is an order of an identification number for uniquely identifying a resource block, and wherein the order is arranged alternately and adjacently before and after said base-point resource block.

4. The setting apparatus according to claim 1, wherein said predetermined sequence is an order of an identification number for uniquely identifying a resource block, and wherein a descending order and an ascending order are different between said adjacent communication area and an own communication area.

5. The setting apparatus according to claim 1, wherein said communication load is a communication load on an own communication area.

6. The setting apparatus according to claim 1, wherein said communication load is a communication load on communication areas other than an own communication area.

7. A communications system comprising:
 a determining section for determining a base-point resource block serving as a base point in setting a priority resource block to be preferentially used by a terminal whose communication path quality does not satisfy a predetermined quality, said base-point resource block being determined differently from that for an adjacent communication area; and
 a setting section for setting said priority resource block in a predetermined sequence from said determined base-point resource block serving as a base point based on a communication load.

8. A base station comprising:
a determining section for determining a base-point resource block serving as a base point in setting a priority resource block to be preferentially used by a terminal whose communication path quality does not satisfy a predetermined quality, said base-point resource block being determined differently from that for an adjacent communication area; and
a setting section for setting said priority resource block in a predetermined sequence from said determined base-point resource block serving as a base point based on a communication load.

9. A setting method comprising:
a determining step of determining a base-point resource block serving as a base point in setting a priority resource block to be preferentially used by a terminal whose communication path quality does not satisfy a predetermined quality, said base-point resource block being determined differently from that for an adjacent communication area; and
a setting step of setting said priority resource block in a predetermined sequence from said determined base-point resource block serving as a base point based on a communication load.

10. A program for a setting apparatus, said program being stored on a non-transitory computer readable medium, the program causing said setting apparatus to execute:
determining processing of determining a base-point resource block serving as a base point in setting a priority resource block to be preferentially used by a terminal whose communication path quality does not satisfy a predetermined quality, said base-point resource block being determined differently from that for an adjacent communication area; and
setting processing of setting said priority resource block in a predetermined sequence from said determined base-point resource block serving as a base point based on a communication load.

* * * * *